United States Patent [19]
Debras et al.

[11] Patent Number: 6,063,878
[45] Date of Patent: May 16, 2000

[54] PROCESS FOR THE PREPARATION OF POLYETHYLENE WHICH HAS A BROAD MOLECULAR WEIGHT DISTRIBUTION

[75] Inventors: Guy Debras, Les Bons Villers; Hugo Vandaele, Antwerp, both of Belgium

[73] Assignee: Fina Research, S.A., Feluy, Belgium

[21] Appl. No.: 08/928,976

[22] Filed: Sep. 12, 1997

Related U.S. Application Data

[60] Provisional application No. 60/037,320, Feb. 7, 1997.

[30] Foreign Application Priority Data

Sep. 13, 1996 [EP] European Pat. Off. ............... 96114683
Feb. 2, 1997 [EP] European Pat. Off. ............... 97101976

[51] Int. Cl.[7] ................................. C08F 4/69; C08F 2/14; C08F 210/14
[52] U.S. Cl. ................................. 526/64; 526/65; 526/73; 526/106; 526/348.5
[58] Field of Search .................................. 520/64, 65, 73, 520/106

[56] References Cited

U.S. PATENT DOCUMENTS 3,392,213  7/1968  Berger ........................................ 526/65
5,648,439  7/1997  Bergmeister et al. .................. 526/106

*Primary Examiner*—Fred Teskin
*Attorney, Agent, or Firm*—Jimmy D. Wheelington; M. Norwood Cheairs

[57] ABSTRACT

Process for the preparation of polyethylene by the homopolymerization of ethylene or by the copolymerization of ethylene and of at least one alpha-olefinic comonomer containing from 3 to 10 carbon atoms, in two reactors for loop polymerization in liquid phase which are connected in series in the presence of a chromium catalyst, in which ethylene and the chromium catalyst are first introduced into the first reactor at a temperature of 95 to 110° C. to produce an ethylene homopolymer of low molecular weight of a melt index $MI_2$ of at least 1 g/10 minutes and in which the ethylene homopolymer thus obtained is next transferred into the second reactor to which ethylene and optionally the alpha-olefinic comonomer is added, at a temperature of 80 to 90° C. to obtain an ethylene copolymer of high molecular weight.

15 Claims, No Drawings

PROCESS FOR THE PREPARATION OF POLYETHYLENE WHICH HAS A BROAD MOLECULAR WEIGHT DISTRIBUTION

This application claims the benefit of U.S. Provisional Application No. 60/037,320, filed Feb. 7, 1997.

The present invention relates to a process for the preparation of polyethylene which has a broad molecular weight distribution. More particularly, the present invention relates to the preparation of high, intermediate and low density polyethylene exhibiting a broad or bimodal molecular weight distribution.

In particular in the case of high density polyethylene the molecular weight distribution (MWD) is one of the fundamental properties which determines the properties of the polymer and hence of its applications.

Although it may be difficult to assess the influence of each one of the properties when it is taken independently, it is generally recognized that the molecular weight d determines chiefly the mechanical properties, whereas the scatter of molecular weight determines chiefly the rheological properties.

As an increase in molecular weight normally improves the physical properties of resins, there is a strong demand for polyethylene of high molecular weight. However, it is the high molecular weights that make the polymers more difficult to convert. Furthermore, an increase in the MWD tends to improve the flow at high shear rate during the conversion. Accordingly, in applications which demand a fast conversion with fairly high die swell, as in the blowing and extrusion techniques, broadening of the M makes it possible to improve the conversion of polyethylene at high molecular weight (=low melt index or low $MI_2$).

It is thought that, when the polyethylene exhibits both a high molecular weight and a broad molecular weight distribution, the conversion is made easier by the fraction of low molecular weight, while the fraction of high molecular weight contributes to a good impact strength of the film. A polyethylene of this type can be converted by expending less energy with higher yields.

The MWD can be described completely by means of the curve obtained by gel permeation chromatography. However, the MWD is generally described by a value which is a good assessment, also called the polydispersity index, which represents the ratio between the weight-average molecular weight and the number-average molecular weight. The MWD required varies from 10 to 30, depending on the applications.

In order to obtain the advantages of a broad distribution, it was initially proposed to prepare polyethylene which has a broad MWD by mixing polyethylenes which have different molecular weights. However, the results did not turn out to be satisfactory because a simple mix does not behave like an intimate mixture of polyethylenes prepared in situ. It has also been proposed to employ reactions in two stages in a reactor. Examples of these processes are described in patent publications GB-A-1,174,542, GB-A-2,020,672 and BE-A-883687.

It has also been proposed to employ a number of reactors connected in series. In this context there is a known process for the preparation of a polymodal ethylene polymer in which ethylene is polymerized in two stages in the presence of an organoaluminum compound containing a halogen, a transition metal compound and different quantities of hydrogen in each stage (British patent No. 1,233,599).

There is also a known process for the preparation of olefin polymers by a two-stage polymerization, in which process the polymer of high molecular weight is prepared during the first stage with a low $H_2/C_2H_4$ ratio and the polymer of low molecular weight is prepared in the second stage with a high from $H_2/C_2H_4$ ratio (patent application EP-A-57 352). The catalyst employed is, among others, an organoaluminum compound containing a halogen and the product of reaction of an organomagnesium compound containing oxygen, of an organotitanium compound containing oxygen (these two compounds being in solution) and of an aluminum halide. A similar process is described in patent application EP-A-57 420. A process for polymerizing ethylene in two stages has also been proposed in which the pressure in the second reactor is kept lower than that in the first reactor; the polymerization is performed in the presence of a usual Ziegler-Natta catalyst such as a transition metal catalyst supported on a solid support and an organoaluminum compound. Examples of such processes are described in patents U.S. Pat. No. 4,414,369 and U.S. Pat. No. 4,338,424. However, the ethylene polymers obtained by means of these processes do not carry long side chains, which is unfavorable for their processability. This is the reason why the Applicant Company has developed processes for production of polyethylene by the copolymerization of ethylene and of one or more alphaolefinic comonomers containing from 3 to 10 carbon atoms, in two reactors for loop polymerization in liquid phase which are connected in series, in the presence of a catalyst system consisting of the product of the reaction of an organomagnesium compound with a titanium compound, an organoaluminum compound and optionally one or more electron donors, of a metallocene catalyst with an aluminoxane as cocatalyst or of a chromium catalyst, which have formed the subject-matter of patent applications EP-A-580 930 and 649 860.

However, these two processes exhibit the major disadvantage of being based on the production of very copolymerized high molecular masses in the first reactor and of low molecular masses in the second reactor. This configuration is necessary owing to the fact that the molecular weights are controlled by additions of hydrogen and that it is difficult in two reactors for loop polymerization in liquid phase which are connected in series to produce the low molecular masses first and to release the excess hydrogen between the two reactors. In addition, the comonomer which is not incorporated into the polymer chains produced in the first reactor is entrained into the second, where it can react and be incorporated into the low molecular masses.

The objective of the present invention consequently consists in overcoming the abovementioned disadvantages and in producing high, intermediate and low density ethylene polymers which have good processability, good physical and especially mechanical properties, and in which there is no incorporation of the comonomer into the lower molecular masses.

To this end, according to the present invention, a process is provided for the preparation of polyethylene by the homopolymerization of ethylene or by the copolymerization of ethylene and of at least one alpha-olefinic comonomer containing from 3 to 10 carbon atoms, in two reactors for loop polymerization in liquid phase which are connected in series, in the presence of a chromium catalyst.

Ethylene and the chromium catalyst are first introduced into the first reactor at a temperature of 95 to 110° C. to produce an ethylene homopolymer of low molecular weight of a melt index $MI_2$ of at least 1 g/10 minutes.

The ethylene homopolymer thus obtained is transferred into the second reactor into which ethylene and optionally an alpha-olefinic comonomer is added, at a temperature of 80 to 90° C. to obtain an ethylene homopolymer or an ethylene copolymer of high molecular weight.

The chromium catalyst is advantageously a chromium catalyst on a support, activated, said catalyst preferably containing 1% of chromium and its support being preferably based on silica and titanium oxide.

According to an advantageous embodiment of the invention the catalyst has a specific surface of 300 to 750 m²/g, advantageously of 400 to 600 m²/g, and a pore volume of 1 to 3 cc/g, advantageously of 1.3 to 2.7 cc/g.

According to another advantageous embodiment of the invention the quantity of polymer formed in the first reactor is from 45 to 55% by weight of the total polymer and, when an alpha-olefinic comonomer is injected, it is chosen from the group including 1-butene, 1-pentene, 1-hexene, 4-methyl-1-pentene, 1-heptene and 1-octene.

The invention also relates to the polyethylene with broad molecular weight distribution and of very good homogeneity, which is thus obtained.

As already mentioned, the ethylene feed, the chromium catalysts and, where appropriate, hydrogen are injected into the first liquid phase loop reactor at a polymerization temperature of 95 to 110° C., preferably of 104 to 109° C., to produce an ethylene homopolymer. These loop reactors are known in practice and are described, for example, in patents U.S. Pat. Nos. 3,152,872, 3,242,150 and 4,613,484.

Any type of chromium catalyst will be employed as catalyst, but activated chromium catalysts on a support are particularly well suited for this purpose. Particularly advantageous yields of polyethylene have thus been obtained with catalysts containing 1% of chromium on a support based on silica and titanium oxide, which are preactivated before being introduced into the reactor, in air at a temperature of 500 to 900° C., preferably of approximately 650° C. and optionally reduced with carbon monoxide at a temperature of 300 to 500° C. Catalysts on a support which will be employed are catalysts with a specific surface of 300 to 750 m²/g and preferably of 400 to 600 m²/g and with a pore volume of 1 to 3 cc/g and preferably of 1.3 to 2.7 cc/g. The residence time of the ethylene and of the chromium catalyst in the first reactor is preferably adjusted to produce from 45 to 55% by weight of the total polymer.

As already stated, the first reactor is heated to a temperature of 95 to 110° C. and preferably to a temperature of 104 to 109° C. in order to give a homopolymer product consisting essentially of low molecular masses, of high density and of a melt index $MI_2$ of at least 1 g/10 minutes and preferably higher than 2 g/10 minutes.

According to the invention the ethylene homopolymer stream obtained in the first polymerization reactor is next transferred into the second loop reactor, for example through the intermediacy of one or more legs for separation from the first reactor, as described in patent application EP-A-649 860. At this time the second reactor is also fed with ethylene and optionally with alpha-olefinic comonomer such as, for example, 1-butene, 1-pentene, 1-hexene, 4-methyl-1-pentene, 1-heptene, 1-octene or a mixture of these. The reaction in this second reactor is carried out at a temperature of 80 to 90° C., advantageously of 84 to 86° C., preferably in the presence of an inert diluent such as, for example, an aliphatic or cycloaliphatic hydrocarbon like butane, pentane, hexane, heptane, cyclohexane, methylcyclohexane, or an aromatic hydrocarbon such as benzene or toluene. A cocatalyst of the alkylmetal, preferably of alkylaluminum or aluminoxane or boroxane or alkylboron type, is preferably added to the reaction product of the second polymerization reactor to lower the melt index of the copolymer product obtained.

The operating conditions in the second reactor are adapted in order that the ethylene homopolymer or copolymer should have a high molecular weight and the desired melt index and density. The final polymer will thus preferably have a melt index $MI_2$, lower than 0.1 g/10 minutes.

Although the polymerization pressure in the first reactor is slightly higher than that in the second reactor, in general a pressure ranging from 30 to 50 bars and a residence time of the reactants in each of the two reactors of between 25 and 90 minutes will be employed. A pressure of approximately 40 bars in the second reactor and a slightly higher one such as, for example, 42 bars in the first reactor will thus be advantageously employed. In fact, it is necessary at the very least that the inert diluent containing the dissolved ethylene should remain liquid and the pressure could thus be increased if the cost of the reactor materials did not become prohibitive The process is generally carried out continuously, that is to say that the ethylene homopolymer consisting of low molecular masses and containing the active catalyst is transferred continuously into the second reactor by means of a transfer line such as, for example, a leg for decanting from the first rector, connecting the two reactors.

The predominant advantage of the process of the invention is that, by adapting the operating conditions of polymerization in the first and the second reactor, such as especially the polymerization temperature and pressure, the choice of the chromium catalyst, the quantity of ethylene injected and the addition of the cocatalyst, a final ethylene polymer is obtained with the desired melt index, density and molecular weight distribution.

The production of ethylene homopolymer of low molecular mass in the first reactor solves the problem encountered in patent applications EP-A-580930 and EP-A-649860, where the production of polyethylene of high molecular mass takes place in the first reactor; this latter arrangement unavoidably causes entrainment into the second reactor of the comonomer not incorporated into the polymer chains formed in the first reactor.

Two nonlimiting examples are given below, describing the preparation of polyethylene according to the process of the present invention, together with two comparative examples.

EXAMPLES 1 AND 2

Ethylene copolymerization was carried out with 1-hexene in two loop reactors in liquid phase, connected in series, according to the polymerization process described above, in the conditions specified in Table 1 below. Isobutane was employed as diluent. The concentration of triethylaluminum (TEAl) is given in relation to the quantity of isobutane. The catalyst is a catalyst containing 1% of chromium on a support of silica and titanium oxide (4% of titanium), activated at 650° C. It corresponds to the following characteristics:

| | |
|---|---|
| specific surface | 443 m²/g, |
| pore volume | 1.4 cc/g, |
| mean pore diameter | 125 Å. |

The physical properties, such as the melt index ($MI_2$), the high load melt index (HLMI), the ratio of these indices HLMI/$MI_2$ (SR) and the density, as well as the mechanical properties (stress cracking resistance) of the final product are also given in Table 1.

COMPARATIVE EXAMPLES 3 AND 4

Copolymerization of ethylene with 1-hexene was carried out in a single reactor in the reaction conditions shown in Table 1. The properties of the monomodal resin obtained are also described in this table.

It is found that the polyethylene resins produced by the process of the invention have, at a given density, a stress cracking resistance (Bell ESCR) which is much better and an SR value which is much higher.

TABLE 1

| Example | Two reactors in series | | A single reactor | |
|---|---|---|---|---|
| | (1) | (2) | (3) | (4) |
| First Reactor | | | | |
| Volume (L) | 70 | 70 | 70 | 70 |
| Catalyst | Cr/Support activated at 650 ° | | | |
| T (°C.) | 106 | 106 | 105 | 103 |
| TEAL (ppm) | 0 | 0 | 0 | 0 |
| Ethylene (kg/h) | 3,1 | 3,1 | 9,3 | 10 |
| 1-Hexene (cc/h) | 0 | 0 | 75 | 87 |
| $H_2$ (Nl/h) | 0 | 0 | 10 | 10 |
| Isobutane (kg/h) | 30 | 30 | 26 | 26 |
| Residence Time (min) | 71 | 71 | 68 | 66 |
| Release Gas | | | | |
| Ethylene (% by weight) | 1,9 | 1,8 | 4,3 | 4, |
| 1-Hexene (% by weight) | 0 | 0 | | |
| $H_2$ (% by volume) | 0 | 0 | 0,08 | 0,12 |
| $MI_2$ (g/10 min.) | 2,1 | 2,4 | 0,09 | 0,09 |
| Density (g/cc) | 0,964 | 0,964 | | |
| % polymer produced in 1st reactor | 51 | 52 | | |
| Second Reactor | | | | |
| Volume (L) | 35 | 35 | | |
| T (°C.) | 85 | 84 | | |
| TEAL (ppm) | 0,5 | 1,0 | | |
| Ethylene (kg/h) | 4,0 | 4,1 | | |
| 1-Hexene (cc/h) | 393 | 1073 | | |
| $H_2$ (Nl/h) | 0 | 0 | | |
| Isobutane (kg/h) | 7 | 7 | | |
| Residence Time (min) | 28 | 28 | | |
| Release Gas | | | | |
| Ethylene (% by weight) | 5,8 | 6,1 | | |
| 1-Hexene (% by weight) | 0,46 | 1,0 | | |
| $MI_2$ (g/10 min) | 0,07 | 0,09 | 0.29 | 0,295 |
| HLMI | 13,2 | 18,6 | 25,3 | 26,9 |
| SR | 189 | 207 | 86 | 91 |
| Density (g/cc) | 0,9584 | 0,9567 | 0,9581 | 0,958 |
| Bell ESCR $F_{50}$ (hres) 50° C.-100% antarox | 175 | $F_o > 350$ | 57 | 54 |

What is claimed is:

1. A process for the copolymerization of ethylene and of at least one alpha-olefinic comonomer containing from 3 to 10 carbon atoms in two reactors for loop polymerization in liquid phase which are connected in series, in the presence of a chromium catalyst, comprising:

a) introducing ethylene and a chromium catalyst into the first reactor at a temperature of 95 to 110° C. to produce an ethylene homopolymer of low molecular weight of melt index $MI_2$ of at least 1 g/10 minutes;

b) transferring the ethylene homopolymer and the chromium catalyst into the second reactor at a temperature of 80 to 90° C.; and c) adding the alpha-olefinic comonomer to obtain an ethylene copolymer of high molecular weight.

2. The process according to claim 1 wherein the chromium catalyst is an activated chromium catalyst on a support.

3. The process according to claim 2 wherein the catalyst contains 1% of chromium and its support is based on silica and titanium oxide.

4. The process according to claim 3 wherein the catalyst has a specific surface of 300 to 750 $m^2/g$ and a pore volume of 1 to 3 cc/g.

5. The process according to claim 4 wherein the catalyst has a specific surface of 400 to 600 $m^2/g$ and a pore volume of 1 to 3 cc/g.

6. The process according to any one of claims 1 to 5 wherein the quantity of polymer formed in the first reactor is from 45 to 55% by weight of the total polymer.

7. The process according to any one of claims 1 to 5 wherein the alpha-olefinic comonomer is selected from the group consisting of 1-butene, 1-pentene, 1-hexene, 4-methyl-1-pentene, 1-heptene and 1-octene.

8. The process according to any one of claims 1 to 5 wherein the polymerization temperature in the first reactor is from 104 to 109° C. and the polymerization temperature in the second reactor is from 84 to 86° C.

9. The process according to any one of claims 1 to 5 wherein the polymerization pressure in the first and the second reactor is form 30 to 50 bars.

10. The process according to any one of claims 1 to 5 wherein a cocatalyst of the alkyl metal, aluminoxane or boroxane type is added to the second reactor.

11. The process according to any one of claims 1 to 5 wherein the cocatalyst is an alkylaluminum.

12. The process according to any one of claims 1 to 5 wherein the polymer formed in the first reactor has a melt index of at least 2 g/10 minutes.

13. The process according to any one of claims 1 to 5 wherein the final polymer has melt index $MI_2$ lower than 0.1 g/10 minutes.

14. The process according to any one of claims 1 to 5 wherein it is carried out continuously.

15. The process according to claim 11 wherein the cocatalyst is triethylaluminum.

* * * * *

UNITED STATES PATENT AND TRADEMARK OFFICE
CERTIFICATE OF CORRECTION

PATENT NO.   : 6,063,878
DATED        : May 16, 2000
INVENTOR(S)  : Guy Debras, Hugo Vandaele It is certified that error appears in the above-identified patent and that said Letters Patent is hereby corrected as shown below:

On the title page item [30],

Foreign Application Priority Data

Sep. 13, 1996 [EP] European Patent Office....96114683
        Feb. 7, 1997  [EP] European Patent Office....97101976

Signed and Sealed this

Third Day of April, 2001

Attest:

NICHOLAS P. GODICI

*Attesting Officer*    *Acting Director of the United States Patent and Trademark Office*